Nov. 7, 1950 P. C. GOLDMARK 2,528,510

COLOR TELEVISION

Filed May 10, 1946 6 Sheets-Sheet 1

INVENTOR
PETER C. GOLDMARK
BY
Pennie, Davis, Marvin & Edmonds
ATTORNEYS

Nov. 7, 1950 P. C. GOLDMARK 2,528,510

COLOR TELEVISION

Filed May 10, 1946 6 Sheets-Sheet 2

INVENTOR
PETER C. GOLDMARK
BY
Brumbaugh, Davis, Morris & Edmonds
ATTORNEYS

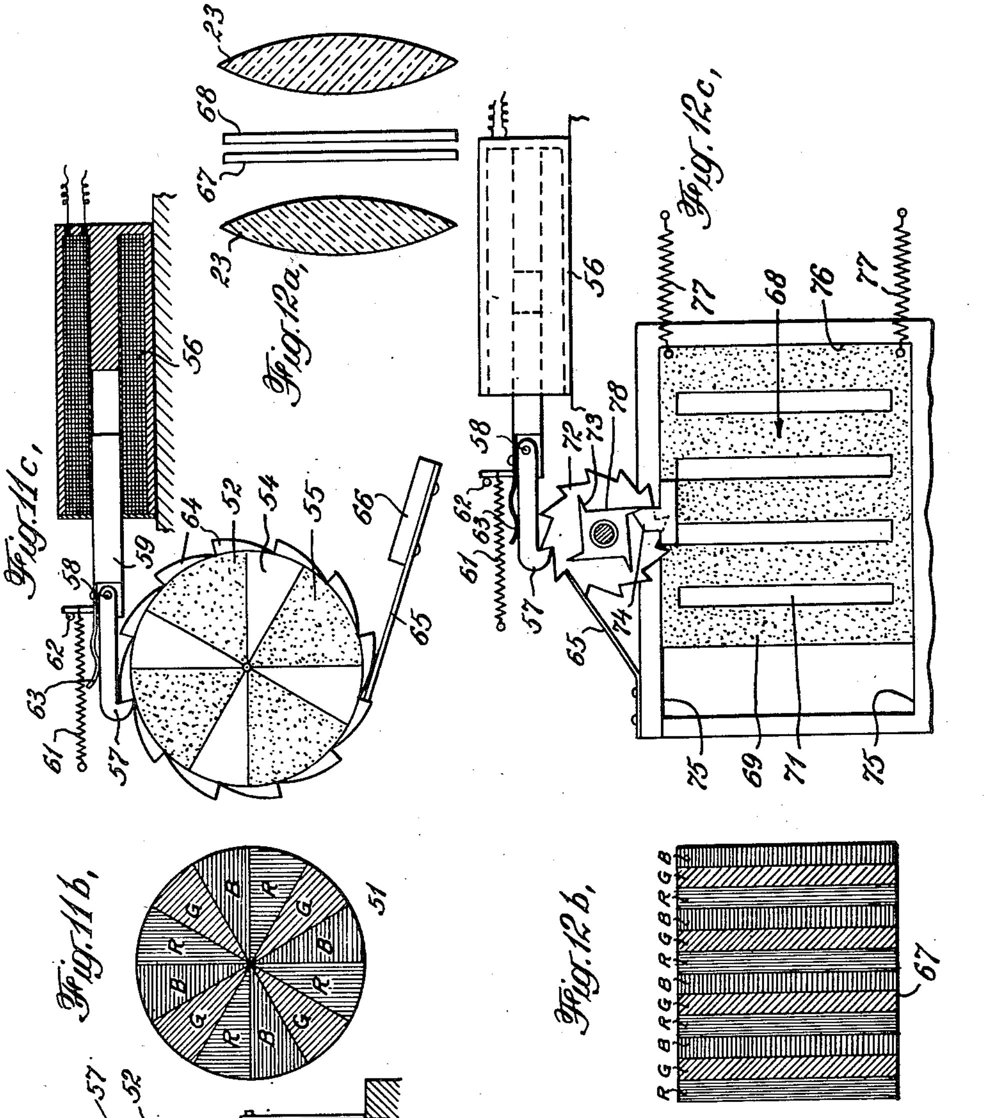
Fig. 11b, Fig. 11c, Fig. 12a, Fig. 12b, Fig. 12c,
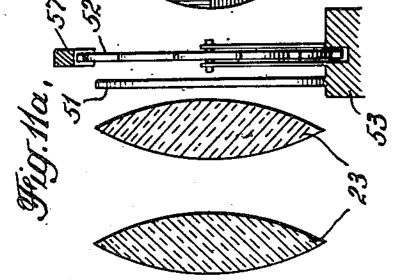
Fig. 11a,
INVENTOR
PETER C. GOLDMARK
BY
Pennie, Davis, Marvin & Edmonds
ATTORNEYS Nov. 7, 1950 P. C. GOLDMARK 2,528,510
COLOR TELEVISION
Filed May 10, 1946 6 Sheets-Sheet 4
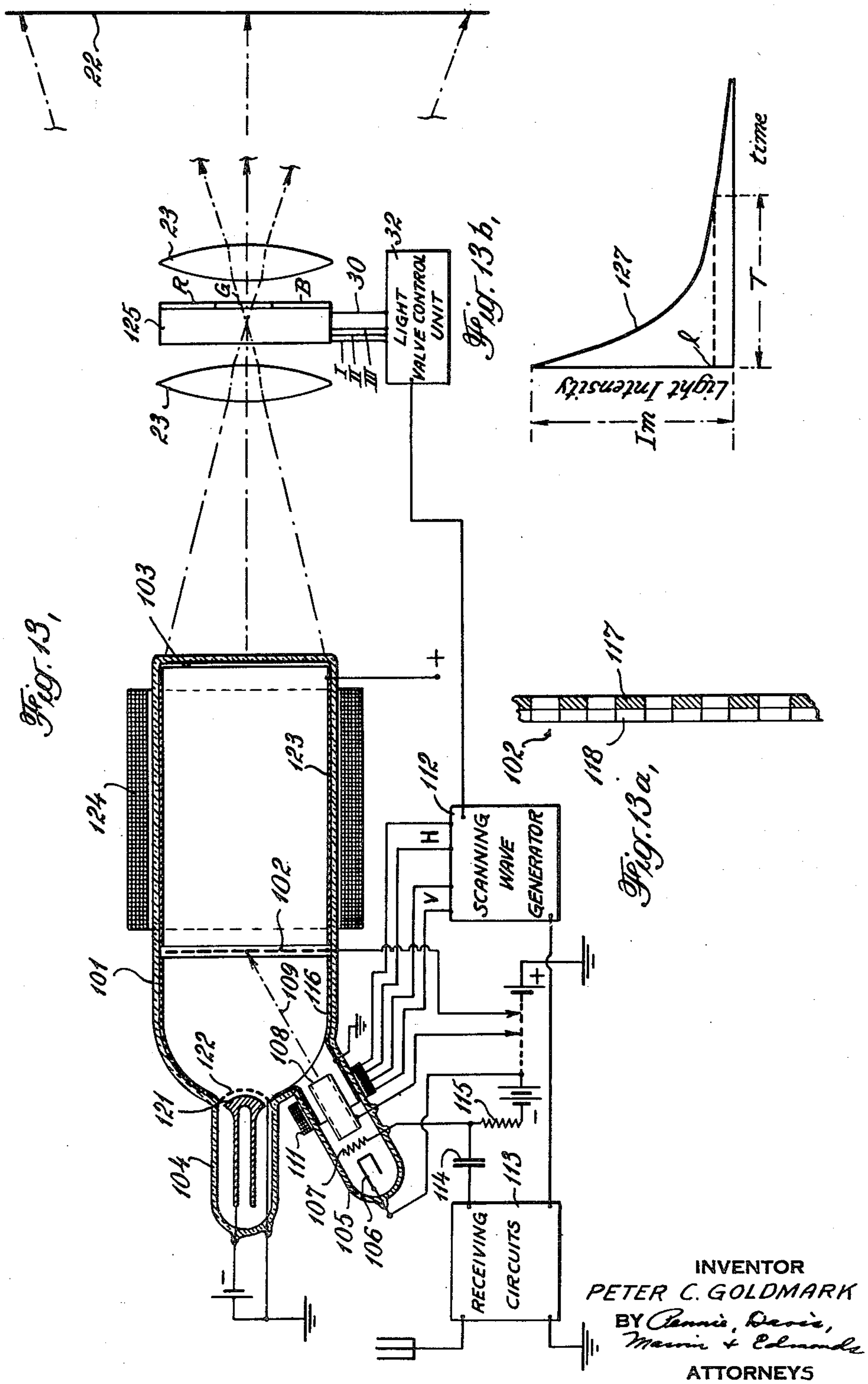
Fig. 13, Fig. 13a, Fig. 13b,
INVENTOR
PETER C. GOLDMARK
BY Rennie, Davis, Marvin & Edmonds
ATTORNEYS

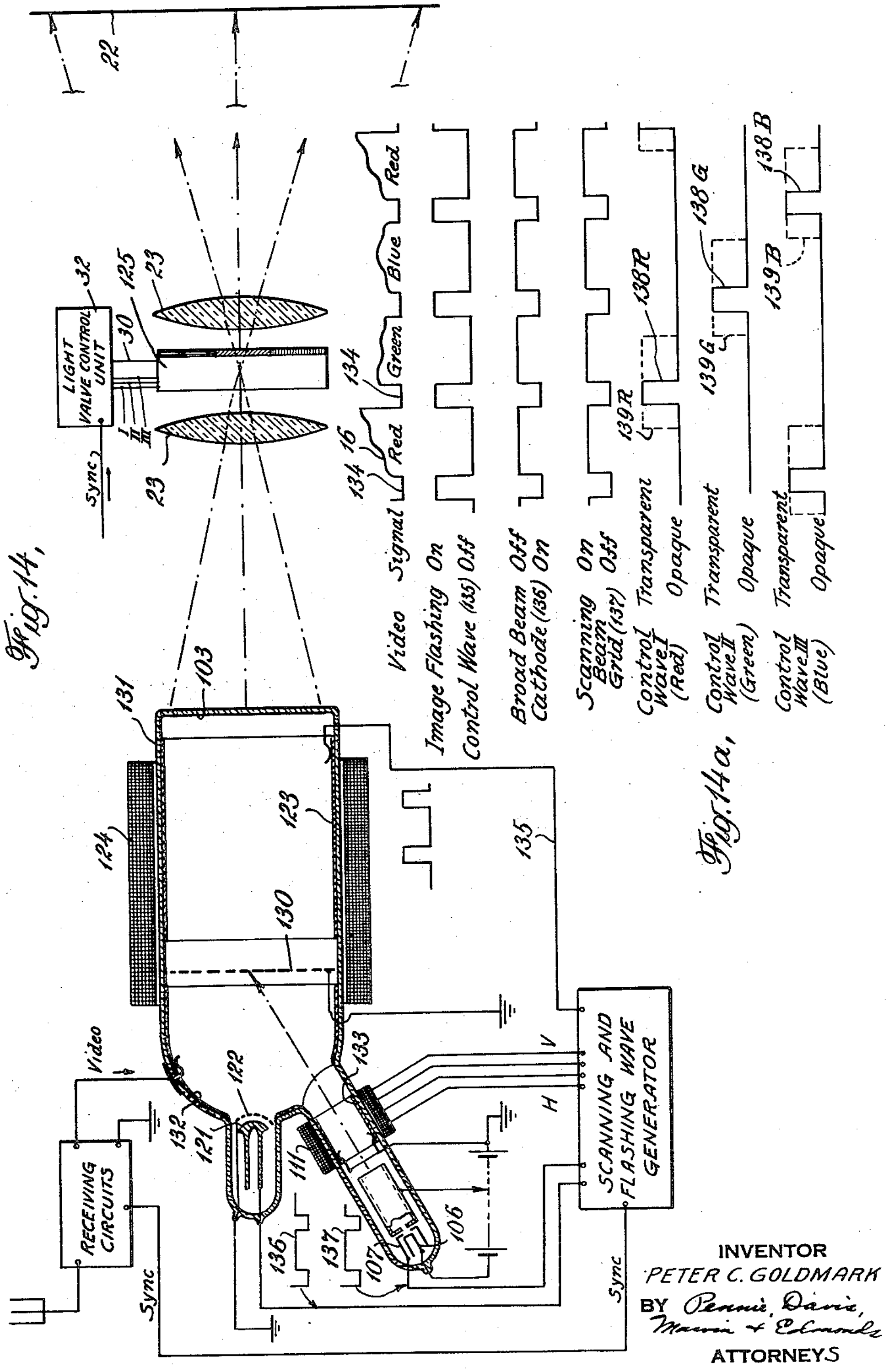
Fig. 14, Fig. 14a,
INVENTOR
PETER C. GOLDMARK
BY Pennie, Davis, Marvin & Edmonds
ATTORNEYS INVENTOR
PETER C. GOLDMARK
BY Pennie, Davis, Marvin & Edmonds
ATTORNEYS Patented Nov. 7, 1950 2,528,510

UNITED STATES PATENT OFFICE 2,528,510

COLOR TELEVISION

Peter C. Goldmark, New Canaan, Conn., assignor to Columbia Broadcasting System, Inc., New York, N. Y., a corporation of New York Application May 10, 1946, Serial No. 668,815

34 Claims. (Cl. 178—5.4)

This invention relates to color television, and has for a principal object the provision of an improved method and apparatus for controlling the color of transmitted and reproduced images.

A number of systems have been employed or proposed for televising scenes in natural colors. In some systems images representing different primary colors of an object are transmitted simultaneously and in others successively. The latter type is preferred at present. Both two-color and three-color systems have been proposed, but the latter is considered preferable for it produces adequate color fidelity. Interlaced or non-interlaced scanning procedures are practicable for color, as well as for black-and-white television. Also, in the systems wherein the color images are transmitted successively, the primary colors may be changed for successive field scansions, or for successive line scansions, or for successive groups of lines.

One color television system which has been found very satisfactory in practice is that described in my copending application, Serial No. 355,840, filed September 7, 1940, now Patent No. 2,480,571, granted August 30, 1949. This system employes interlaced scanning and the successive field scansions correspond to different primary colors of an object field.

Many of the known color television systems have employed rotating filter disks or drums which expose successive color-separation images in different primary colors. An embodiment of such a disk is described in my Patent No. 2,304,081, issued December 8, 1942, and means for synchronizing a disk with received television signals is disclosed in my Patent No. 2,329,194, issued September 14, 1943. Such a system employing a rotating filter element has been found in practice to yield excellent color pictures.

Since the advent of television there has been a demand for larger and larger pictures, with increased detail and brilliance. This demand can be met by larger cathode-ray receiving tubes with direct viewing, or by the use of projection tube methods. Filter disks and drums are entirely practicable in such developments but, particularly in the case of large tubes with direct viewing, considerable care in design and construction is required to minimize noise and there is also the expense of providing effective driving and synchronizing equipment. Furthermore, the trend in the art has been toward employing electronic methods rather than mechanical elements wherever possible.

The present invention provides a projection system with a novel type of color control device which is relatively small and compact, and it eliminates the need for large rotating masses. According to one aspect of the invention, there is provided a completely electronic system, avoiding entirely the use of mechanical moving elements. According to another aspect of the invention, mechanical moving elements are utilized, but they may be made small and light and consequently readily controllable. Although especially designed and adapted for use in a receiver for reproducing color images successively, the color control methods and apparatus of the invention also may be adapted for use at a transmitter and in systems employing simultaneous transmission and reproduction of different color-separation values.

In this specification it is often found convenient to refer to "color-separation values" and "color-separation images." By analogy to the color photographic art, the term "color-separation value" may be applied to the component of a particular primary color in an object field, and "color-separation image" to a monochrome image, usually black and white, representing a particular primary color. Such an image may be that of the complete object field to be reproduced, or only a portion thereof.

In accordance with another aspect of the invention as applied to a color television receiver, luminous color-separation images are reproduced at a receiver, preferably with a cathode-ray tube, and projected to a viewing screen by a suitable projection optical system, for example, a lens. A plurality of filters of different primary colors are positioned in the path of the projected light rays, preferably at or near the projection optical system. Associated with the filters is a light control device, or light valve, which can be selectively actuated to control the light passing through the different filters. As an image of given color-separation value is reproduced, the light valve is actuated to allow light to pass through the corresponding color filter and to substantially obstruct light from passing through filters of different color to the viewing screen. As images of different color-separation value are successively reproduced, the light valve is actuated to successively clear light paths through filters of corresponding color and to substantially obstruct light paths through filters of non-corresponding color. Thus, the section of the light valve controlling the light path through a filter of given color is rendered alternately substantially transparent and substantially opaque as required by the color-separation values of the successively reproduced images.

In accordance with the broad aspects of the invention, the light valve may be of any suitable type. However, to produce an all-electronic system, the invention contemplates employing a light valve of, for example, the type containing a medium stressable by an electric field of force to alter the light transmission of the valve. The valve may contain a suspension of tiny substantially flat, substantially opaque or light-intercepting particles in an electrically polarizable liquid carrier, and adapted to be aligned by an electrostatic field. Such cells have been described by Donal, and jointly by Donal and Langmuir, in the Proceedings of the I. R. E., May 1943, page 195, et seq. Light valves of the polarization type, such as the Kerr cell, and valves employing electron opacity effects may also be employed. Many such light valves are known in the art. In the present invention the sections of the light valve may be adapted to operate alternately between substantially fully transparent and substantially fully opaque conditions and, especially where the color of the projected images changes from field to field, the speed of response of the valve sections is much lower than that required for modulating light at video frequencies. Hence many types of light valves are practical for the present invention which would be impractical for video-frequency control.

Instead of employing light valves of the fully electronic type, the invention also contemplates the use of valves having small movable mechanical elements. As examples, several types are described employing small pivoted flaps or shutters which may be alternately closed and opened to obstruct or pass light. Rotatable or slidable shutters, cooperating with filters which remain in the path of the projection light, are also described. Many variations of such shutter light valves may be devised and used in accordance with the invention.

By placing the color control unit (comprising filters and light valve) near the lens, its transverse dimensions may be approximately those of the lens and hence the unit may be relatively small and compact. In the successive type of projection only a fraction of the projection light is allowed to pass to the viewing screen at any given instant, namely, the fraction passing through the filter of proper color, and therefore this type of color control necessarily entails a loss of projection light. However, adequate illumination at the viewing screen may be obtained by increasing the luminosity of the projected images or by using storage cathode-ray tubes.

The combination of storage tubes and color control unit, in accordance with the invention, presents certain problems involving color carryover. For example, if the reproduced stored image is a red color-separation image and the color control unit is switched from red to green, the resultant green projected image will not correspond to the proper green color-separation value. Furthermore, since signals representing different elemental areas of an object field are stored progressively, by a scanning procedure, whereas the switching of the color control unit takes place at spaced intervals, different parts of a given color-separation image may be projected through the corresponding filter for different lengths of time.

Broadly, such effects of color carryover and unequal projection times are eliminated, in accordance with the invention, by limiting the storage reproduction of a given elemental area to a period not substantially exceeding the blanking interval between signal portions representing different color-separation values. In the usual case colors will be changed for successive field scansions and the storage will be limited to the field-blanking interval. If the color is changed from line to line, the limit will be the line-blanking interval. For tubes in which the stored signals decay after the initial charge, the period of decay may be predetermined in accordance with the above limits. In tubes where the stored signals persist until erased or rescanned, erasure may follow the storing progressively after the predetermined interval, or flashing technique may be employed to reproduce a given color-separation image during the blanking interval following the storing thereof. The combination of this flashing technique with the color control unit yields advantageous results in simplicity of the control unit and ease of switching from one color to the next.

While especially designed and adapted for use at the receiver, the color control unit may be employed at the television transmitter, if desired. The transmitter commonly employs an optical system for imaging an object field at the scanning tube, and the filters and light valve may be placed at or near this optical system. Likewise, the unit can be used in film scanners in a similar manner.

It will be noted that both the transmitting and receiving systems described above include an optical system for rendering an object field conjugate to an image field, one of which fields may be a scanning area, and that the color of the light passing from one of these fields to the other is controlled by means of the light valve and associated color filters.

At the receiver, it is preferred to reproduce luminous color-separation images and then control the color of the projected images by operating sections of the light valve alternately between fixed transparent and opaque levels, as described above. Light valves, however, can be made which are capable of being modulated at video frequencies. In such case, in accordance with another aspect of the invention, the video frequencies may be applied directly to the different sections of the light valve so as both to control the color of the projected light and to simultaneously modulate it in accordance with the received signals. In such case, a luminous unmodulated scanning pattern is produced on the screen of a cathode-ray tube, or by other suitable means, and this scanning pattern projected to the viewing screen through the video modulated light valve and filters. The video signals representing different color-separation images may be transmitted and reproduced either successively or simultaneously. In the case of successive transmission the different sections of the light valve are rendered operable in succession and the section operable at any given instant is modulated in accordance with the video signal representing that particular color. In the case of simultaneous transmission, the sections are individually modulated in accordance with the video signals of respective color-separation values.

It will be noted that whether sections of the light valve are operated between opaque and transparent conditions, or are modulated by the video signals, the light transmission characteristics of the sections are selectively controlled to control the color of the projected images.

The invention will be more fully understood by the following detailed description thereof to be considered in conjunction with the drawings, in which.

Figures 1, 2, 2A, 2B, 3:
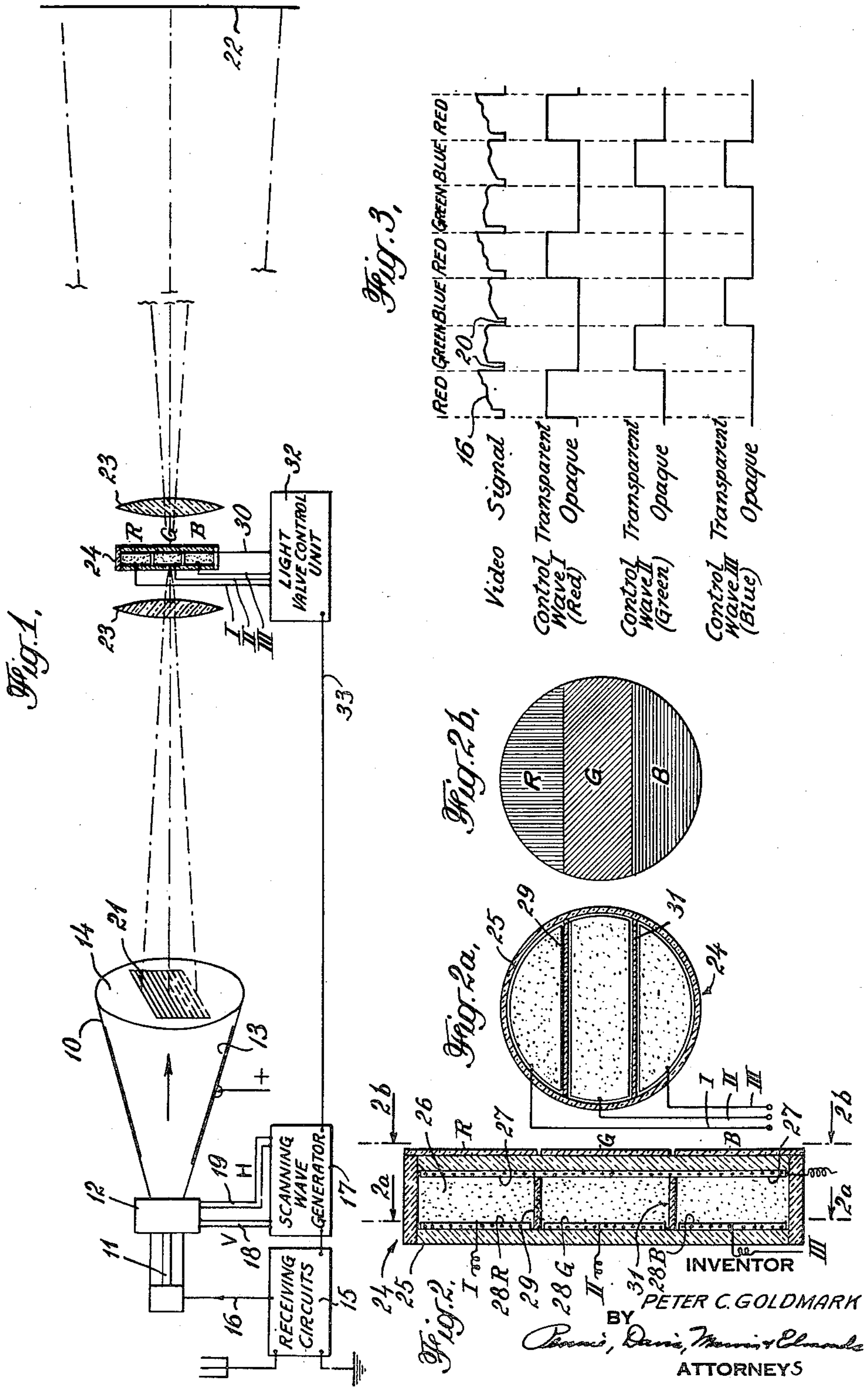
Fig. 1 is a diagrammatic view of an all-electronic color television receiver.
Fig. 2 is an enlarged view in cross-section of the color control unit.
Figures 4, 5A, 5B, 6, 7, 7A, 8, 9, 10:
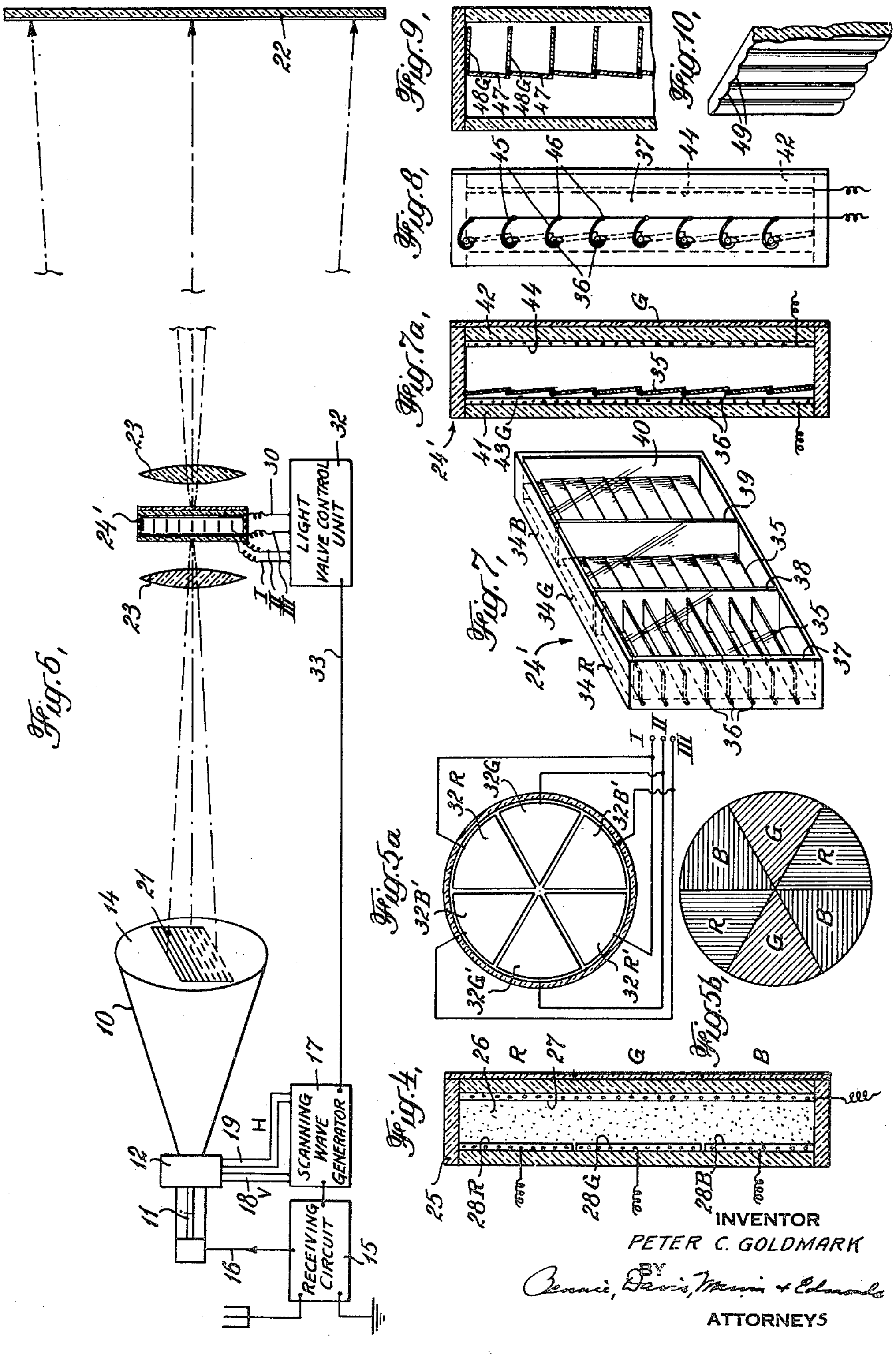
Figures 15, 16:
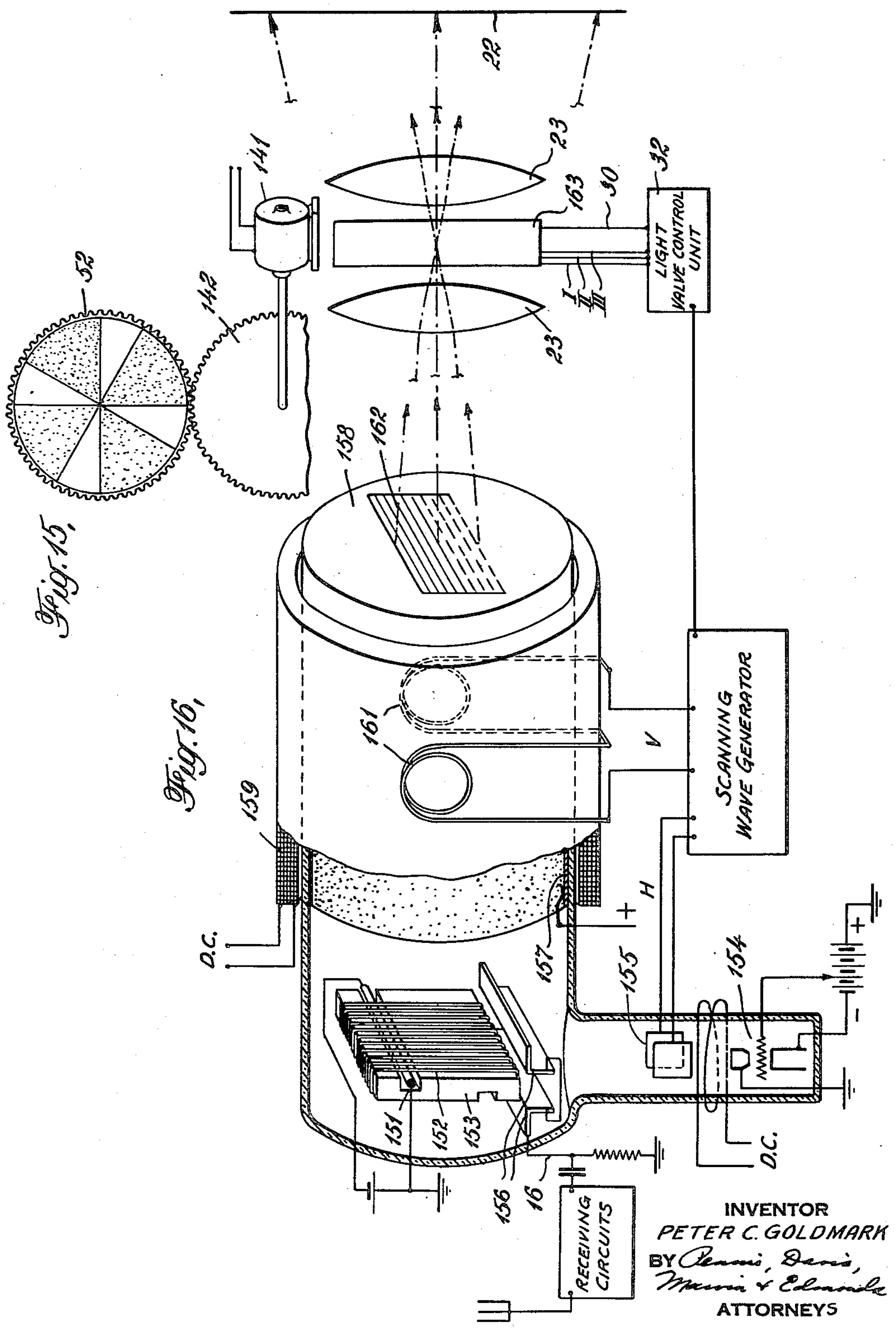

Fig. 2*a* is a section taken along the line 2*a* of Fig. 2, and Fig. 2*b* is a rear view of the color control unit;

Fig. 3 shows representative wave forms which may be used to control the light valve;

Fig. 4 is a cross-section showing a modified form of the light control unit;

Fig. 5*a* is a front view, partially in section, of a further modification of the light control unit, and Fig. 5*b* is a rear view thereof;

Fig. 6 is a diagrammatic view of a receiver system employing a shutter-type color control unit;

Fig. 7 is a perspective view of the shutter type light valve, and Fig. 7*a* is a cross-section showing the shutters in closed position;

Fig. 8 is an end view of a modified form of shutter valve;

Fig. 9 is a partial section of a further modification of the shutter type valve;

Fig. 10 is a fragment of the projection screen of Fig. 6;

Fig. 11*a* is a side view of a different embodiment of the light control valve employing a rotating shutter disk and Figs. 11*b* and 11*c* show the filter and shutter disks, respectively;

Fig. 12*a* is a side view of another embodiment of the light valve employing a lineated shutter screen, and Figs. 12*b* and 12*c* show the filter and shutter, respectively;

Fig. 13 is a diagrammatic view of a color receiver system employing a storage tube of the decay type;

Fig. 13*a* is a detail of the charge storage screen of the tube of Fig. 13, and Fig. 13*b* is a graph showing a representative decay characteristic of the tube;

Fig. 14 is a diagrammatic view of a receiver system employing a non-decay storage tube, and Fig. 14*a* shows representative wave forms;

Fig. 15 is a detail showing a modified form of the shutter disk; and

Fig. 16 is a diagrammatic view of a receiver system employing a line-storage cathode-ray tube.

Referring to Fig. 1, 10 is a cathode-ray receiver tube containing an electron gun structure 11, electromagnetic scanning coils 12, collecting anode 13 and fluorescent screen 14. Any desired type of cathode-ray tube may be employed, preferably of high screen intensity, and electrostatic rather than electromagnetic deflection may be utilized.

Transmitted color television signals are received, amplified and detected in unit 15 and the video signal 16 applied to the control grid of the electron gun 11. Scanning wave generator 17 is supplied with synchronizing pulses derived from received signals in unit 15 and generates suitable vertical saw-tooth scanning waves 18 and horizontal saw-tooth scanning waves 19 which are supplied to the deflecting coils 12. As a result of the video signal and scanning waves, luminous images are reproduced successively on an area 21 of the fluorescent screen 14. These luminous images correspond to different color-separation values of the object field in accordance with the received color video signals.

The luminous images are projected to the viewing screen 22 by a projection optical system, here shown as a projection lens 23 composed of two spaced lens elements. Lens 23 may be considered as rendering the scanning area or object field 21 conjugate to an image field or area at the viewing screen. The viewing screen 22 may be of any suitable type, preferably a highly efficient transmitting-type screen to utilize the projection light as efficiently as possible. Any other suitable projection optical system may be employed.

At the projection lens 23 is positioned the light valve 24 and associated filters R, G and B, comprising the color control unit. The control unit is here shown as positioned between the two elements of the projection lens 23 at a principal plane thereof so that it will be interposed in the path of the projection light at the smallest cross-section thereof, and so as to minimize any aberrations introduced by the unit and to avoid imaging the unit at the viewing screen. It will be understood that the light control unit and filters need not be positioned as shown in Fig. 1, but may be placed elsewhere in the path of the projection light if desired. However, care should be taken to avoid introducing aberrations, or imaging the valve or filters at the viewing screen.

As seen more clearly in Figs. 2, 2*a* and 2*b*, the light valve 24 comprises a transparent cell wall 25 containing a suspension 26 of tiny substantially flat light-intercepting particles in a liquid carrier. For example, flakes of graphite in oil may be employed. The particles are adapted to be aligned by an electrostatic field as is described in the Donal, and Donal and Langmuir articles supra. The cell is provided with a back electrode 27 and three front electrodes 28R, 28G and 28B. Thus by applying different potentials between the three front electrodes and the back electrode it is possible to control selectively the light transmission of the three sections and hence the amount of light passing through respective filters to the viewing screen 22.

The electrodes are transparent, electrically conducting films so as to permit light to pass through the cell, and are here shown on the inner walls of the cell in contact with the fluid medium 26 so that potentials applied between the front electrodes and the back electrode applies an electrostatic field or stress directly to the fluid medium. If desired, the electrodes may be formed on the outer surfaces of the cell, but in such case leakage through the cell walls and through the fluid medium should be taken into account in order to control the light valve action properly.

The light valve 24 is here shown as divided into three sections by means of partitions 29 and 31 which are preferably opaque.

In operation, a difference in potential between a front electrode, say 28G, and the back electrode 27 will result in more or less aligning the light-intercepting particles to render the cell transparent. Obviously, substantially perfect transparency cannot be attained, since the particles even when properly aligned intercept some of the projection light. While it is desirable to have the valve sections pass as much light as possible when in the most transparent condition, much less than perfect transparency can be tolerated without rendering the system inoperable.

When the potential difference between the front and back electrodes is removed, the particles assume random orientations and hence intercept substantially the rays of the projection light. In the present application this is termed the opaque condition of the cell, although it is realized that some portion of the rays of the projected light will pass through the valve, depending upon the size of the particles and the proportion of particles to the liquid carrier. The operation characteristic of the valve can be determined by measuring the ratio of the light transmitted in the aligned or most transparent condition to the light transmitted in the unaligned or most opaque condition. Ratios of 10 to 1 or more are realizable and thus light of one color will not be accompanied by more than 10% of light of another color. Such an admixture of undesired color is considered tolerable in practice.

The filters R, G and B are here shown affixed to the rear wall of the light valve 24 in line with respective cell sections. This facilitates the effective control of light passing through the filters by the corresponding sections of the valve. Partitions 29 and 31 assist in preventing light through one valve section from passing through adjacent filters. If desired, the filters could be placed on the front wall of the valve or could even be removed some distance from it, provided the light paths between the filters and the corresponding sections of the valve are such that the valve sections can effectively control the light passing through the filters to the projection screen.

The actuating potentials are applied to the front electrodes of the light valve through leads I, II and III by the light valve control unit 32 (Fig. 1) which is synchronized with the reproduction of successive color-separation values by a synchronizing wave supplied from generator 17 through lead 33. The synchronizing wave may be derived from the received television signals in a well-known manner. The rear electrode 27 may be held at a constant potential, for example, ground, through lead 30.

As described above, partitions 29 and 31 divide the light valve 24 into three sections. These sections may be equal in area if the color filters have equal transmitting efficiencies and the images corresponding to different color-separation values have the proper relative luminosities. However, the partitions may be positioned to divide the cell into unequal areas if desired, so as to compensate for other parts of the system and produce an image at the viewing screen of correct color balance. Also, general methods for obtaining correct color balance, such as that described in my copending application Serial No. 357,032, filed September 17, 1940, now Patent No. 2,406,760, may be employed in any of the systems of the present invention, if desired.

The several sections need not have the shape shown in Fig. 2*a*. For example, the valve may be divided into pie-shaped sectors, or annular sections, or in any other desired manner. Furthermore, two or more sections may be employed to cooperate with filters of the same color.

Referring now to Fig. 3, a video signal 16 is shown having successive portions representing different color-separation values of an object field. The red portion of the signal may correspond to a single line, a group of lines, or a field or frame scansion, depending upon the particular color system being employed. Blanking intervals 20 are shown between video signal trains representing different colors.

Control waves I, II, III have wave forms and phases such that the corresponding sections of the light valve 24 are rendered transparent during the reproduction of video signal portions of corresponding color. Control wave I is a rectangular wave which, during the reproduction of red color-separation values, impresses a voltage between electrodes 28R and 27 to render that portion of the cell transparent. During the reproduction of green and blue color-separation values, control wave I removes the voltage between the electrodes and the section becomes opaque. Control waves II and III function in a similar manner for the green and blue color-separation values. The generation of such control waves is well-known in the art. For example, see Patent No. 2,306,386 to Hollywood.

As shown, the control waves are phased 120 electrical degrees in succession, and each transparent portion lasts for 120 degrees. Departures from the exact shape and phase relationship shown may be permissible or desirable in many cases depending upon the speed of response of the light control sections. If the speed of response is somewhat slow, it may be desirable to overlap the transparent portions of successive control waves. Generally speaking, the control waves should be of such shape, and so phased with respect to the reproduction of successive color-separation values as to permit light to pass through filters of color corresponding to the color-separation values as they are reproduced, and to substantially obstruct light through filters of non-corresponding color.

In the preferred system the red, green and blue portions of the video signal will correspond to successive interlaced field scansions. Thus a given color will be reproduced throughout a field scansion and the colors will be changed during the field blanking intervals. Field (or vertical) synchronizing signals may be employed to synchronize the operation of the light valve control unit so that the changeover from one section of the light valve to the next is effected simultaneously with the change in color-separation value of the reproduced images.

If for any reason it is desired to change color from line to line, line synchronizing signals may be used to synchronize the light valve control unit 32. If the color is changed for groups of lines less than a field scansion, special synchronizing signals may be provided to effect the color changeover.

Referring to Fig. 4, a color control unit is shown similar to that of Fig. 2 except that the partitions 29 and 31 are omitted. The light valve may still be considered as having several sections cooperating respectively with the red, green and blue filters, and controlled respectively by the front electrodes 28R, 28G and 28B. In practice a light valve of this type would be relatively thin and, particularly when the rays of light passing through the cell are substantially parallel, reliance may be placed upon the thinness to prevent light rays controlled by one valve section from passing through adjacent filters.

Figs. 5*a* and 5*b* show a modified form of the color control cell which is similar to those of Fig. 2 and Fig. 4 except for the shape and number of the sections. Here the sections are sector-shaped and two sectors are employed for each primary color. Opaque partitions between the individual sectors may be employed or omitted as desired. Three pairs of front electrodes, 32R, 32R′, 32G, 32G′, 32B and 32B′ are employed to control the light transmission of the respective sections, and are fed by control waves I, II and III as shown. A common back electrode is employed. The filter sectors R, G and B may be attached to the front or rear faces of the cell, or spaced therefrom as described in connection with Fig. 2.

Referring now to Fig. 6 an embodiment of the invention is shown employing a different type of light valve in which movable shutters are controlled to pass or obstruct the light rays. The arrangement is similar to Fig. 1 except for the light valve 24' so that the common features need not be described again.

As more clearly shown in Figs. 7 and 7*a*, the light valve is of the multiple shutter type having three sections 34R, 34G and 34B each containing a plurality of opaque shutters 35. The shutters are pivoted at 36 in end plates 37, 38, 39 and 40. These end plates are advantageously opaque. The front and rear walls 41 and 42 are transparent. Each cell section is provided with an individual front transparent conductive coating as in the cell of Fig. 2. Fig. 7*a* shows one such coating 43G for the section which controls the passage of light through the green filter. A transparent conductive coating 44 is provided on the inner surface of the rear wall 42, common to all three sections. Different color filters are associated with different sections.

In operation, when an electric potential is applied between front and rear electrodes of one section, the shutters in that section assume a substantially horizontal position, and the section passes light. This is the transparent condition. When the potential is removed the flaps fall, by force of gravity, to the closed or opaque position illustrated in Fig. 7*a*. Thus the control of the light valve of Fig. 7 is similar to that of Fig. 1 and the waves of Fig. 3 apply.

Fig. 8 is a modified version of the shutter type cell in which small springs are provided to spring-bias the flaps to the closed position. Thus, springs 45 are attached at 46 to an end plate 37 and the opposite ends of the springs are attached to the pivots 36 of respective shutter flaps. In this embodiment only a single electrode is provided for the three cell sections, and this electrode is a transparent conductive film 44 on the inner surface of the rear wall. Instead of employing front electrodes, the control waves are applied directly to the flaps through wires attached to the springs of respective sections. When a potential is applied between the conductive coating 44 and the flaps of any one cell section, the flaps in that section will assume a substantially horizontal position and will pass light. When the potential is removed, the flaps will close under the action of springs 45, and the section will return to the opaque condition. Wave forms such as shown in Fig. 3 may be employed to control the flaps in the several sections.

It will be understood that the types of electrical control of the flaps described herein are for example only and that any other type may be employed if desired. Filters may be attached to each cell section or spaced therefrom as discussed in connection with Fig. 2.

Fig. 9 shows a further modification in which the filters and flaps are combined in one structure. One cell section, for example the green section, is shown therein. It is provided with flaps having opaque portions 47 and filter portions 48G. In the position shown, the opaque portions 47 obstruct light. Upon rotation clockwise, the opaque portions 47 will assume as substantially horizontal position to pass light, and filter portions 48G thereupon will be rotated into the paths of the light so that green light will issue from the cell section. Any desired type of electrical control, for example, that of the cells of Fig. 7 and Fig. 8 may be employed as desired. The flaps of the red and blue cell sections will be provided with red and blue filters, as will be understood.

While it is preferred to actuate the sections of the shutter valve electrically, as described, it is also possible to actuate them mechanically.

Fig. 10 shows a fragment of the projection screen 22 of Fig. 6. The screen is provided on the front surface with parallel cylindrical surfaces 49 so as to utilize the projected light efficiently. The surfaces serve to diffuse the light in a horizontal plane. The screen may be provided on the other surface with cylindrical lenses at right angles to lenses 49 or with horizontal scratches so as to diffuse light in a vertical direction. Any other appropriate screen may be employed.

Figs. 11*a*, 11*b*, and 11*c* illustrate a different type of shutter control unit or multiple shutter, which may be used in the system of Fig. 6. Associated with lens 23 is a color disk 51 and rotating multiple shutter disk 52 placed in the path of the projection light to the lens. Preferably the color and shutter disks are as close together as possible and positioned closely adjacent the lens so as to provide effective control.

The color filter disk 51 is fixed to a suitable support 53 and is composed of sector shaped filter segments of different color arranged around a circular area. As illustrated, there are four sets of red, green and blue sectors spaced in regular sequence. Cooperating with the filter disk is a shutter disk 52 composed of alternate transparent sectors 54 and opaque sectors 55. The shutter disk is designed so that, when properly aligned with the filter disk, only filters of one color are exposed at any one time, but upon rotation filters of different color are exposed in sequence. Since each of the filters of disk 51 are sectors of 30 degrees, and filters of the same color are spaced at 90-degree intervals, the transparent areas 54 of the shutter disk are sectors of 30 degrees and are similarly spaced 90 degrees apart. Transparent areas 54 may be open areas or of transparent material as desired.

The shutter disk is rotated intermittently by means of a solenoid actuated ratchet and pawl arrangement. An actuating pawl 57 is pivoted at 58 to the plunger 59 of the solenoid 53. Spring 61 holds the plunger 59 against a stop 62 when the solenoid is not energized.

The pawl 57 is pressed by flat spring 63 against the ratchet teeth 64 of the shutter disk. Upon energization, the solenoid pulls the pawl 57 to the right and rotates the shutter disk through the angle subtended by one ratchet tooth. Another flat spring 65 attached to a suitable fixed support 66 permits the shutter disk to advance tooth by tooth and prevents rotation in the reverse direction.

The number of teeth 64 is equal to the number of filter sectors on disk 51 so that as the shutter disk is advanced intermittently tooth by tooth, different color filters are successively exposed.

With the system of Fig. 11 substituted for the cell 24' of Fig. 6, the energization of the solenoid is synchronized with the projection of successive color-separation images so that when an image of one color, say red, is being projected, shutter disk 52 will clear paths through the red filters of disk 51. During the blanking interval between images of different color-separation value, the solenoid is energized to clear light paths through the next color filters and obstruct light paths through the previous color filters.

As an example, if successive color-separation images represent successive field scansions in red, green and blue, the solenoid 56 will be energized during field blanking intervals to rotate the shutter disk from one color to the next. Suitable operating pulses for the solenoid may be derived from the field synchronizing signals. The phasing of the shutter disk with respect to the successive color-separation images, so that red color-separation images are projected through red filters, and so forth, may be performed manually or automatically in any manner desired.

It will be understood that instead of using a stationary color filter disk and rotating shutter disk, the shutter could remain stationary and the filter disk rotated instead. Or, the two disks could be rotated in opposite directions or by different amounts in the same direction so as to clear paths through different color filters in succession. Also, different numbers of filter sections may be used, as desired.

Figs. 12*a*, 12*b* and 12*c* illustrate a further embodiment of the shutter valve in which the shutter and filter are moved laterally with respect to each other, instead of rotating. In Fig. 12*a* the filter 67 and shutter 68 are placed between the elements of lens 23. As shown in Fig. 12*b*, filter 67 is composed of several sets of filter strips of different color, alternating in regular sequence. Cooperating with filter 67 is a lineated shutter 68 (Fig. 12*c*) composed of alternate opaque strips 69 and transparent strips 71. The width of a transparent strip 71 corresponds to that of a single filter strip and the spacing corresponds to the spacing of filter strips of like color. The lineated shutter 68 is intermittently moved laterally with respect to the filter 67 to successively expose filters of different color. Ratchet wheel 72 is intermittently rotated by a solenoid arrangement similar to that of Fig. 11*c*. However, to produce the lateral movement an additional toothed wheel 73 is employed, fixed to wheel 72 and cooperating with a tooth 74 on the shutter 68. The shutter moves between guides 75 and is spring-biased toward abutment 76 by springs 77.

Toothed wheel 73 has one tooth for each three teeth of ratchet wheel 72. When the solenoid 56 is energized to move ratchet wheel 72 with the pawl 57, by one tooth, the lineated shutter 68 is moved to the left to uncover the next series of filters. A second energization will move the shutter to expose the next succeeding filters, and a third energization will cause blank tooth area 78 of toothed wheel 73 to come opposite tooth 74 of the shutter, thereby permitting the shutter to slide back to the position shown in Fig. 12*c*.

As a result of this operation, the three differently colored filter strips are successively exposed by shutter 68. The actuation of solenoid 56 will be synchronized and phased with respect to the production of successive color-separation images in the same manner as described in connection with Figs. 11*a*, 11*b* and 11*c*, and the description will not be repeated.

It will be evident that in the embodiments discussed hereinbefore, a considerable portion of the projection light is lost. In a three-color system about two-thirds of the projection light is blocked by the opaque portions of the control cell. The remaining one-third is projected to the viewing screen, assuming the transparent section of the cell passes all of the impinging light. If the transparency is less than perfect more is lost.

There has been considerable progress in recent years in cathode-ray tube technique toward the production of more brilliant images, so that this loss of light may be offset. Also, there has been considerable progress in the development of storage cathode-ray tubes, including those having charge-storage screens controlling a broad flooding beam of electrons, those utilizing electron-opacity effects in ionic crystals, and other types.

These storage tubes may be employed in the systems of the present invention with advantageous results. Certain problems arise, however, which will be discussed hereinafter, and means for solving the problems described.

Referring to Fig. 13, a storage cathode-ray tube 101 is shown employing a storage unit in the form of a charge-storage perforated screen 102. The tube has a glass envelope composed of a cylindrical portion having a fluorescent screen 103 at one end, an axially disposed constricted arm 104 at the other end, and a side arm 105. In side arm 105 is a cathode 106, grid 107 and anode 108 forming an electron gun for the scanning beam 109. A magnetic deflecting yoke 111 is energized from the scanning wave generator 112 to deflect the scanning beam in horizontal and vertical directions to scan an area of the storage screen 102.

Transmitted television signals are received, amplified and detected in 113, and the video portion thereof fed to grid 107 through the coupling capacitor 114 and resistor 115. A conductive coating 116 is formed on the inner surface of the glass envelope and serves as second anode. Coating 116 is grounded, and the first anode 108, grid 107 and cathode 106 are made negative to ground. The grid is slightly negative with respect to the cathode so as to retain effective control of the intensity of the beam 109.

As shown in Fig. 13*a*, charge-storage screen 102 is comprised of a metallic base 117 which is maintained at a negative potential to ground, preferably adjustable as shown, and a secondary-emissive insulating coating 118 on the surface thereof toward the scanning beam. Thus as the electron beam 109 scans the screen 102 it liberates secondary electrons in accordance with the video modulation on grid 107, and forms a charge image on screen 102.

Coaxial arm 104 contains a cathode 121 and grid 122 cooperating with anode 116 to form a broad flooding beam of electrons. Grid 122 is at ground potential and cathode 121 is slightly negative. If desired, additional focussing means may be employed to cause the broad beam electrons to impinge on screen 102 in a uniform density of electrons. The charge image created on screen 102 by the scanning beam will control the passage of broad beam electrons therethrough, and hence the latter will form an electron image in space, just beyond screen 102, whose density varies in accordance with the image to be reproduced.

Another conductive coating 123 on the inner wall of the cylindrical portion of the envelope is maintained at a high positive potential so as to accelerate the broad beam electrons and cause them to impinge on fluorescent screen 103 at a high velocity. A magnetic focussing coil 124 is provided to focus the electron image at the fluorescent screen. Thus a luminous image is created on the fluorescent screen in accordance with the charge image stored on screen 102.

The general principles of such storage tubes are well known, so that further detailed description is unnecessary. It will be understood that wide variations in the potentials applied to the several elements are possible.

Luminous images on the fluorescent screen are projected to the viewing screen 22 by projection lens 23, as described before. At the lens is the light control valve 125 and associated filters R, G and B. The light valve and filters may be any one of the types described hereinbefore and the valve is controlled by unit 32 which is synchronized by suitable signals from the scanning wave generator 112.

Ordinarily in storage tubes of the type described the stored signals persist for substantially the interval between successive scansions of a given elemental area of screen 102, so as to take full advantage of the storage effect. However, this is unsuitable for the system of the present invention. When the color control unit is switched from one color to the next, it is important that luminous images of different color-separation value be substantially removed from screen 103. Otherwise images of different color-separation value will be projected through a filter of one color, and hence undesirable color mixing will occur. To avoid this, the decay or dissipation of stored signals on screen 102 may be predetermined so that such color carryover is avoided.

Fig. 13b shows a decay curve 127 representing the decay of a stored signal on an elemental area of screen 102. The stored signal results in a given luminous spot on fluorescent screen 103, so curve 127 is a plot of light intensity versus time. The initial value of the light intensity will depend upon the intensity of the scanning beam, among other factors, and the decay will be approximately exponential. Theoretically it will take an infinite time for the light intensity to decay to zero, but practically it is found that a decay to 5% of the initial light intensity will not give adverse color carryover, and 10% can usually be tolerated. The time T which it takes for the light intensity to decrease to 1%, 5% or 10% of the original intensity, can be predetermined by proper choice of the leakage resistance of the secondary-electron emissive coating 118 on screen 102, together with other operating parameters of the tube.

The light valve will be switched from one color to the next during the blanking interval between the reproduction of successive color-separation values. If the switching is assumed to take place instantaneously at the end of the blanking interval, the signals stored just prior to the blanking interval can persist for the interval without color carryover. Thus time T should be selected not to exceed substantially this blanking interval. If T exceeds the blanking interval, elemental areas reproduced at the first part of a given scansion will be projected through a given filter for greater lengths of time than those at the end of the scansion so that the color balance of different parts of the image will be adversely affected, as well as having color carryover at the end of the scansion. Preselecting time T as described avoids both of these difficulties.

When colors are changed for successive field scansions, time T may be equal to the field blanking interval. When colors are changed from line to line, time T should be the line blanking interval. If for any reason colors are changed for successive groups of lines, time T should be approximately equal to the blanking interval between the reproduction of the successive groups of lines.

Fig. 14 shows another system employing a storage tube of the type in which stored signals persist substantially without decay until the corresponding areas are rescanned In such case different means may be employed to avoid color carryover and unequal projection times of different parts of a given color-separation image.

The storage tube of Fig. 14 is of the type described in the copending application of Dr. Kurt Schlesinger, Serial No. 668,453. The general arrangement is similar to the tube of Fig. 13 but the method of producing the charge-storage image on screen 130 is different. For convenience, similar elements in the two tubes are given the same numbers and only the differences in the tubes will be described.

In tube 131 of Fig. 14, conductive coating 132 is separate from the conductive coating 133, which latter forms the second anode for the scanning electron gun, and the video signal is applied to coating 132. The grid 107 of the scanning electron gun is maintained at a constant potential during the scanning period so that the scanning beam is unmodulated. When the scanning beam impinges on a given elemental area of screen 130, the secondary electrons emitted are collected by coating 132 at the potential of the video signal which is received at that instant. Hence the elemental area on the screen assumes a potential which differs from that of coating 132 by a substantially constant value. As the scanning proceeds, different elemental areas of screen 130 are changed to different potentials in accordance with the changing magnitude of the video signal as the different elemental areas are scanned. Screen 130 is similar to screen 102 of Fig. 13a, but the secondary emissive coating of screen 130 is of high resistance so that little leakage occurs until a given elemental area is rescanned. When rescanned, a given elemental area assumes a potential corresponding to the new value of the video signal then existing.

It will be evident that unless special measures are taken, a given elemental area, charged in accordance with one color-separation value, will produce a luminous image which will be projected through at least two different color filters, since the color control unit will be switched between successive scansions of the elemental area. To avoid this a flashing technique is employed which is correlated with the operation of the color control unit so that luminous images are reproduced only when light paths are cleared through the proper color filter Reproduction takes place only when electrons are emitted from the broad beam cathode 121, and are accelerated by the high potential on coating 123 so as to produce a luminous image on fluorescent screen 103 under the control of the charge pattern on screen 130. The production of the luminous images may be controlled by simply applying and removing the accelerating potential of coating 123. However, since broad beam electrons may in some cases interfere with the creation of a good charge pattern on screen 130, it is advantageous to shut off the broad beam whenever the accelerating potential is removed from screen 123. It is also advantageous to shut off the scanning beam during the reproduction of images so that scanning beam electrons will not interfere.

The operation will be more clearly understood by referring to Fig. 14*a*. A video signal 16 is shown having successive red, green and blue signal trains, with blanking intervals 134 therebetween. In the preferred system each color will correspond to a field scansion and blanking intervals 134 will be the field blanking intervals.

The image flashing control wave 135 is a rectangular wave having pulses of high potential during the blanking intervals 134 so as to apply a high accelerating potential to coating 123. Between the blanking intervals the control wave 135 is reduced to a low zero potential so as to remove the accelerating potential and hence the luminous image. Control wave 136 is applied to the broad beam cathode 121 and is a rectangular wave supplying negative pulses to the broad beam cathode during the blanking intervals. By reducing the potential of the broad beam cathode, broad beam electrons are allowed to pass to screen 130 and thence to the fluorescent screen under the control of the charge pattern on 130. During the intervals between the blanking intervals 134, the broad beam cathode is made sufficiently positive to substantially cut off the flow of broad beam electrons. Control wave 137 is applied to the scanning beam grid. During the blanking intervals 134 the grid is supplied with pulses sufficiently negative to cut off the scanning beam. Between the blanking intervals, the grid is made more positive so as to allow scanning electrons to flow with substantially constant velocity.

The control waves for the light valve must be synchronized and properly phased with respect to the reproduction of the luminous images. Control waves I, II and III are shown having pulses 138R, 138G and 138B, which render corresponding sections of the light valve transparent during the blanking intervals 134 immediately following the storing of respective color-separation images. Hence, when luminous images are flashed on fluorescent screen 103 by control waves 135, 136 and 137, filters of corresponding color are associated with successive luminous images. Furthermore, since stored signals for all elemental areas are reproduced for the same length of time, equal to the blanking intervals between signal portions representing different color-separation values, proper color and light balance is assured over the whole projected image area.

The use of this flashing technique greatly simplifies the control of the light valve. Since images are reproduced only during the blanking intervals, the light valve may be switched from one color section to the next at any time between successive blanking intervals. Dotted control waves 139R, 139G and 139B are shown by way of example. It will be understood that the control waves need not be identical, although it will ordinarily be easier to generate similar control waves for all three colors. The control wave may be applied to a given cell section, say the red section, at any time during the storing of the red video signal. Hence any time lag in switching the cell to the transparent condition may be taken into account. Similarly, the red section may be switched to the opaque condition at any time prior to the next succeeding field blanking interval, and any time lag in rendering the cell section opaque will be taken care of.

The blanking intervals are commonly only a fraction of the scanning intervals. For example, field blanking intervals are somewhat less than 10% of the field scansions. Thus it is possible, in accordance with the invention, to switch the color control cell slowly from one color to the next in a continuous manner when using the flashing technique as described. If such continuous change is properly phased, filters of one color will be exposed with only a fraction of filters of another color. If the admixture of colors is less than 10%, preferably less than 5%, the color of the projected images will not be seriously affected.

Fig. 15 shows a modification of the shutter and filter disks of Figs. 11*a*, 11*b* and 11*c*, operating in the continuous manner just described, which can be used in the system of Fig. 14. Instead of rotating the shutter disk 52 intermittently, it is driven continuously by a motor 141 and gear 142. The motor is synchronized with the reproduction of different-color separation values and phased so that filters of one color are exposed during the blanking intervals when luminous images of corresponding color-separation value are reproduced. Since the shutter is continuously rotating, a small fraction of the filters on either side of the correct filters will be exposed during the projection interval, but if this does not exceed 5 or 10% it may be tolerated. If desired, opaque spokes may be inserted between the filter sectors so as to eliminate even this small amount of color admixture, although at the expense of a small additional loss of light.

The same principle may be applied to the other types of light valves described herein. In cells like that of Fig. 1, the control waves may be other than rectangular, e. g. sinusoidal. In the shutter types of Figs. 7 through 9, the shutters may be moved slowly from opaque to transparent conditions, or the shutters themselves may be modified for continuous rotation. The lineated screen of Figs. 12*a*, 12*b* and 12*c* may be moved continuously from one side to the other and then allowed to slide back to the initial position. Other modifications will occur to those skilled in the art.

The color control unit of the invention may also be used in systems employing line-storage tubes. Examples of such type tubes are described in British Patent No. 494,145 and in U. S. Patent No. 2,355,212. Fig. 16 shows a tube of the Farnsworth construction in a system of the present invention. This tube employs a linear cathode 151 which emits electrons under the control of a large number of mutually insulated grid wires 152 wound on a suitable insulating support 153. An unmodulated scanning beam is produced by the electron gun 154 and is deflected along the grid wires at line-scanning frequency by the deflecting plates 155. The video signal 16 is fed to the collecting anode plates 156 so that charges are stored on grids 152 in accordance with the line-video signal. The grid is rescanned for successive lines and the charge pattern changed in accordance with the then existing value of the video signal.

Electrons from linear cathode 151 pass through grid 152 under the control of the charge image thereon, and are accelerated by an internal conductive coating 157 maintained at a high potential. The electrons impinge on a fluorescent screen 158 on the end of the tube and form a luminous image of the line thereat. The electron image of the line is maintained in focus by a focussing coil 159 energized from a D.-C. source.

In order to produce a two dimensional image on a fluorescent screen, coils 161 are excited at the vertical or field scanning frequency so as to deflect the electron line image in a vertical direction. The resultant image 162 on the fluorescent screen is projected through lens 23 to the viewing screen 22 as in previous embodiments. The color of the projection light is controlled by color control valve 163 which may be any of the types previously described in connection with Figs. 1 through 14.

If the color of the images changes from field to field, the light valve is actuated accordingly at field scanning frequency. If the color changes from line to line, the flashing technique described in connection with Fig. 14 may be employed to reproduce the line images only during the line-blanking intervals. This will insure that all parts of the line are projected through the correct color filter for equal lengths of time.

In the detailed descriptions given hereinbefore, only three-color reproduction is specifically described, since this is preferable for adequate color fidelity. However, the systems can be modified for two-color reproduction, as will be apparent to those skilled in the art.

It will be apparent that the present invention provides a novel manner of controlling the color of images in a color-television system and that this invention is widely applicable to many different types of receiving and transmitting systems. A number of different embodiments have been described and still further variations will be apparent to those skilled in the art.

I claim:

1. In color television apparatus, the combination which comprises a scanning device, an optical system positioned and adapted to render an area in a plane of said scanning device conjugate to an area at another plane, a color control device positioned between said areas in the path of light rays through said optical system including a light valve and a plurality of filters of different fixed color associated with different portions of the light valve, said different portions of the light valve providing respective different light paths between said conjugate areas and means for selectively altering the light transmission through said different portions of the light valve.

2. In color television apparatus, the combination which comprises an electronic scanning device, an optical system positioned and adapted to render an area of said scanning device in conjugate image-forming relationship with another area, a light valve positioned near said optical system in the path of the light rays therethrough, a plurality of filters of different fixed color associated with different sections of the light valve, said different sections of the light valve providing respective different light paths between said conjugate areas, and means for rendering said different sections transparent successively in predetermined sequence, and substantially opaque during the intervals between the transparent intervals.

3. In a color television system for receiving television signals representing different color-separation values of an object field and reproducing color images therefrom, the combination which comprises a scanning device, a projection optical system positioned and adapted to project light rays from an area of said scanning device to a conjugate area of a viewing screen, a light control device positioned in the path of the projected light rays between said areas, a plurality of filters of different fixed color associated with different portions of the light control device, said different portions of the light control device providing respective different light paths between said conjugate areas, and means for selectively altering the light transmission through said different portions of the light control device.

4. In a color television system for receiving television signals representing different color-separation values of an object field and reproducing color images therefrom, the combination which comprises a luminescent scanning surface, means for periodically scanning said surface, a projection optical system positioned and adapted to project light rays from an area in a plane of said scanning surface to a conjugate area in the plane of a viewing screen, a light control device positioned in the path of the projected light rays between said areas, a plurality of filters of different fixed color associated with different portions of the light control device, said different portions of the light control device providing respective different light paths between said conjugate areas, means for modulating the light rays corresponding to said different colors in accordance with the received television signals, and means for selectively actuating said different portions of the light control device to permit light to pass through filters of color corresponding to said color-separation values as they are reproduced and to substantially obstruct light paths through filters of non-corresponding color.

5. In a color television system for receiving television signals representing different color-separation values of an object field and reproducing color images therefrom, the combination which comprises means for reproducing luminous images representing said color-separation values of received television signals on a reproducing area, a projection optical system positioned and adapted to project images on said reproducing area to a conjugate area of a viewing screen, a plurality of filters of different fixed color positioned in the path of the projected light rays between said areas, a light control device positioned and adapted to alternately obstruct and clear light paths through said filters from said reproducing area to said conjugate area of the viewing screen, and means for actuating said light control device to pass light successively through filters of different color to the viewing screen.

6. In a color television system for receiving television signals representing different color-separation values of an object field and reproducing color images therefrom, the combination which comprises means for reproducing images representing said color-separation values of received television signals on a reproducing area, a projection optical system positioned and adapted to project images on said reproducing area to a conjugate area of a viewing screen, a light valve positioned in the path of the projected light rays between said areas, a plurality of filters of different fixed color associated with different portions of said light valve, and means for selectively rendering said different portions of the light valve alternately transparent and substantially opaque to thereby control the color of the projected images.

7. In a color television system for receiving television signals representing different color-separation values of an object field and reproducing color images therefrom, the combination which comprises means for successively reproducing luminous images representing said different color-separation values on a reproducing area, a projection optical system positioned and adapted to project images on said reproducing area to a conjugate area of a viewing screen, a plurality of filters of different fixed color positioned near said optical system in the path of the projection light, a light control device positioned and adapted to alternately obstruct and clear light paths through said filters from said reproducing area to said conjugate area of the viewing screen, and means correlated with the reproduction of successive color-separation values for operating said light control device to clear successively light paths through filters of corresponding color and substantially obstruct light paths through filters of non-corresponding color.

8. In a color television system for receiving television signals representing different color-separation values of an object field and reproducing color images therefrom, the combination which comprises a cathode-ray tube for successively reproducing luminous images representing said different color-separation values on a reproducing area, a projection optical system positioned and adapted to project images on said reproducing area to a conjugate area of a viewing screen, a plurality of filters of different fixed color positioned near said optical system in the path of the projection light, a light valve positioned in cooperative relationship with said filters and having a plurality of sections actuable to substantially obstruct and clear light paths through filters of respective color from said reproducing area to said conjugate area of the viewing screen, and control means synchronized with said successive image reproduction for actuating said light valve to successively clear light paths through filters of color corresponding to the successive color-separation values of the images and substantially obstruct light paths through filters of non-corresponding color.

9. In a color television system for receiving television signals representing different color-separation values of an object field and reproducing pictures in natural color therefrom, the combination which comprises a cathode-ray receiving tube having a reproducing screen, means utilizing received television signals for reproducing luminous images representing said color-separation values successively on an area of said screen, a projection optical system positioned and adapted to project said images to a viewing screen, a light valve positioned near said projection optical system in the path of the projection light, said valve having means for individually controlling the light transmission of a plurality of sections thereof, said sections providing respective different light paths from said area of the reproducing screen to a conjugate area of the viewing screen, a plurality of filters of different fixed color positioned to filter light rays passing through said plurality of valve sections respectively, and control means synchronized with the reproduction of successive color-separation values for successively rendering light-transmitting the light valve sections associated with filters of corresponding color and rendering substantially opaque the sections associated with filters of non-corresponding color.

10. In a color television system for receiving television signals representing different color-separation values of an object field and reproducing pictures in natural color therefrom, the combination which comprises a cathode-ray receiving tube having a reproducing screen, means for receiving said television signals and successively reproducing luminous images representing said color-separation values on substantially the same area of said screen, a projection optical system positioned and adapted to project said images to a viewing screen, a plurality of filters of different fixed primary colors fixedly spaced transversely of the projected light near the optical system to produce color images at the viewing screen, a light valve positioned near the optical system in cooperation with said filters, said light valve having a plurality of electrical elements selectively energizable to control the light transmission of a plurality of sections thereof cooperating with respectively different color filters, said sections providing respective different light paths from said area of the reproducing screen to a conjugate area of the viewing screen, and control means synchronized with the reproduction of successive color-separation values for successively energizing said electrical elements to render transparent the valve sections cooperating with filters of corresponding color and render substantially opaque other valve sections.

11. An electronic color television system for receiving television signals having successive portions representing successive field scansions in different cyclically recurring primary colors, and for reproducing pictures in natural color therefrom, which comprises a cathode-ray receiving tube, means for receiving said television signals and successively reproducing luminous color-separation images corresponding to successive field scansions on substantially the same area of said tube, a viewing screen, a projection lens positioned and adapted to project said luminous images to substantially the same area of the viewing screen, a plurality of filters of different fixed primary colors fixedly spaced transversely of the projected light at said lens to produce color images at the viewing screen, a light valve positioned at said lens in cooperation with said filters, said light valve having a plurality of electrical elements selectively energizable to render alternatively transparent and substantially opaque a plurality of sections thereof cooperating with respectively different color filters, said sections providing respective different light paths from said area of the tube to a conjugate area of the viewing screen, and control control means synchronized with the reproduction of successive color-separation field scansions for successively energizing said electrical elements to render transparent respective light valve sections cooperating with filters of corresponding color and to render substantially opaque the valve sections cooperating with filters of non-corresponding color.

12. In a color television system for receiving television signals representing different color-separation values of an object field and reproducing color images therefrom, the combination which comprises a scanning device, a projection optical system positioned and adapted to project light rays from said scanning device to a viewing screen, a light valve positioned in the path of the projected light rays between said scanning device and viewing screen, said light valve including a fluid medium stressable by an electric field of force to alter the light transmission of the valve, a plurality of filters of different fixed color associated with different sections of the light valve, and means for selectively applying different fields of force to said different sections to thereby control the amount of light passing to the viewing screen through different color filters.

13. In a color television system for receiving television signals representing different color-separation values of an object field and reproducing color images therefrom, the combination which comprises a scanning device, a projection optical system positioned and adapted to project light rays from said scanning device to a viewing screen, a light valve positioned in the path of the projected light rays between said scanning device and viewing screen, said light valve including a fluid medium stressable by an electric field of force to alter the light transmission of the valve, a plurality of filters of different fixed color associated with different sections of the light valve, and control means for successively applying fields of force to said different sections to render the sections associated with different color filters light-transmitting during the reproduction of corresponding color values and substantially opaque during the reproduction of non-corresponding values.

14. In an electronic color television system for receiving television signals representing different color-separation values of an object field and reproducing pictures in natural color therefrom, the combination which comprises a cathode-ray receiving tube, means for receiving said television signals and successively reproducing luminous images representing said color-separation values on an area of said tube, a projection optical system positioned and adapted to project said images to a viewing screen, a plurality of filters of different fixed primary colors fixedly spaced transversely of the projected light near the optical system to produce color images at the viewing screen, a light valve having a fluid medium electrostatically stressable to alter the light transmission of the valve and a plurality of electrodes associated with a corresponding plurality of sections of the valve, said light valve being positioned near said optical system with said sections in the paths of light through a corresponding plurality of said filters, a source of control waves connected to the electrodes of the light valve and adapted to actuate the sections thereof to alternately transparent and substantially opaque conditions in predetermined sequence, said source being synchronized with the reproduction of successive color-separation values to successively clear light paths through filters of corresponding color and substantially obstruct light paths through filters of non-corresponding color.

15. In an electronic color television system for receiving television signals representing different color-separation values of an object field and reproducing pictures in natural color therefrom, the combination which comprises a cathode-ray receiving tube, means for receiving said television signals and successively reproducing luminous images representing said color-separation values on an area of said tube, a projection optical system positioned and adapted to project said images to a viewing screen, a plurality of filters of different fixed primary colors fixedly spaced transversely of the projected light near the optical system to produce color images at the viewing screen, a light valve containing a suspension of substantially flat light-intercepting particles adapted to be aligned by an electrostatic field in an electrically polarizable liquid carrier, a plurality of electrodes associated with different sections of the light valve, said light valve being positioned near said optical system with said sections in the paths of light through a corresponding plurality of said filters, a source of control waves connected to the electrodes of the light valve and adapted to actuate the sections thereof to alternately transparent and substantially opaque conditions in predetermined sequence, said source being synchronized with the reproduction of successive color-separation values to successively clear light paths through filters of corresponding color and substantially obstruct light paths through filters of non-corresponding color.

16. An electronic color television system for receiving television signals having successive portions representing successive field scansions in different cyclically recurring primary colors, and for reproducing pictures in natural color therefrom, which comprises a cathode-ray receiving tube, means for receiving said television signals and successively reproducing luminous color-separation images corresponding to successive field scansions on substantially the same area of said tube, a viewing screen, a projection lens positioned and adapted to project said luminous images to substantially the same area of the viewing screen, a plurality of filters of different fixed primary colors fixedly spaced transversely of the projected light at said lens to produce color images at the viewing screen, a light valve containing a suspension of substantially flat light-intercepting particles adapted to be aligned by an electrostatic field in an electrically polarizable liquid carrier, a plurality of electrodes associated with different sections of the light valve, said light valve being positioned at said lens with said sections in the paths of light through a corresponding plurality of said filters and close thereto, a source of control waves connected to the electrodes of the light valve and adapted to actuate the sections thereof to alternately transparent and substantially opaque conditions in predetermined sequence, said source being synchronized with the reproduction of successive color-separation values to successively clear light paths through filters of corresponding color and substantially obstruct light paths through filters of non-corresponding color.

17. In a color television system for receiving television signals representing different color-separation values of an object field and reproducing color images therefrom, the combination which comprises means for reproducing luminous images representing said color-separation values of received television signals, a projection optical system positioned and adapted to project said images to a viewing screen, a plurality of filters of different fixed color positioned in the path of the projection light near said optical system, shutter means operable to clear light paths through filters of different color successively and to substantially obstruct other light paths, and control means synchronized with the reproduction of said color-separation values for operating said shutter means to clear light paths through filters of corresponding color.

18. In a color television system for receiving television signals representing different color-separation values of an object field and reproducing color images therefrom, the combination which comprises a cathode-ray tube receiver for successively reproducing luminous images representing said different color-separation values, a projection optical system positioned and adapted to project said images to a viewing screen, a plurality of filters of different fixed color and associated multiple shutter means interposed in the path of the projection light near said optical system, said multiple shutter means being operable to selectively clear light paths through the portion of said filters of one color and to substantially obstruct other light paths from the luminous images to the viewing screen, and control means synchronized with the reproduction of the luminous images for operating said multiple shutter means to successively clear light paths through filters of color corresponding to the different color-separation values as they are reproduced.

19. In a color television system for receiving television signals representing different color-separation values of an object field and reproducing color images therefrom, the combination which comprises a cathode-ray tube receiver for successively reproducing luminous images representing said different color-separation values on a reproducing area thereof, a projection optical system positioned and adapted to project said images to a viewing screen, a plurality of filters of different fixed color and associated multiple shutter interposed in the path of the projection light near said optical system and extending transversely thereof, said multiple shutter having elements movable relative to the filters and operable to selectively clear light paths through the portion of said filters of one color and to substantially obstruct other light paths from the luminous images on said reproducing area to a conjugate area of the viewing screen, and control means synchronized with the reproduction of the luminous images for operating said multiple shutter to successively clear light paths through filters of color corresponding to the different color-separation values as they are reproduced.

20. In a color television system for receiving television signals representing different color-separation values of an object field and reproducing color images therefrom, the combination which comprises means for reproducing images representing said color-separation values of received television signals, a projection optical system positioned and adapted to project said images to a viewing screen, a light valve positioned in the path of the projected light rays near said optical system having a plurality of sections and shutter means in each section movable alternatively to substantially transparent and opaque positions, filters of different fixed color associated with respectively different sections of the light valve and arranged to filter light rays passing through said sections during the intervals of transparency thereof, and control means for selectively actuating the shutter means in said sections to thereby control the color of the projected images.

21. In a color television system for receiving television signals representing different color-separation values of an object field and reproducing color images therefrom, the combination which comprises means for successively reproducing luminous images representing said different color-separation values on a reproducing area, a projection optical system positioned and adapted to project said images to a viewing screen, a light valve positioned in the path of the projected light rays from said reproducing area to a conjugate area of the viewing screen, said light valve having a plurality of sections and rotatably mounted shutters therein movable alternatively to substantially transparent and opaque positions, filters of different fixed color associated with respectively different sections of the light valve and arranged to filter light rays passing through said sections during the intervals of transparency thereof, and control means synchronized with the reproduction of the luminous images for moving the shutters of sections associated with different color filters to the transparent position during the reproduction of corresponding color-separation values and to the opaque position during the reproduction of non-corresponding color-separation values.

22. In a color television system for receiving television signals representing different color-separation values of an object field and reproducing color images therefrom, the combination which comprises means for successively reproducing luminous images representing said different color-separation values on a reproducing area, a projection optical system positioned and adapted to project said images to a viewing screen, a light valve positioned in the path of the projected light rays from said reproducing area to a conjugate area of the viewing screen, said light valve having a plurality of sections each containing electrostatically-controlled rotatably mounted shutters movable alternatively to substantially transparent and opaque positions, filters of different fixed color associated with respectively different sections of the light valve and arranged to filter light rays passing through said sections during the intervals of transparency thereof, and control means adapted to apply electrostatic fields to the sections of the light valve, said control means being synchronized with the reproduction of the luminous images to render said sections transparent during the reproduction of corresponding color-separation values and opaque during the reproduction of non-corresponding color-separation values.

23. In a color television system for receiving television signals representing different color-separation values of an object field and reproducing color images therefrom, the combination which comprises means for reproducing images representing said color-separation values of received television signals, a projection optical system positioned and adapted to project said images to a viewing screen, a plurality of filters of different fixed color and a cooperating shutter positioned in the path of the projected rays near said optical system and mounted for relative movement therebetween, the shutter and color filters being designed and arranged so that relative movement clears light paths through different color filters in succession, and means for producing said relative movement synchronized with the reproduction of images of different color-separation values to clear paths through filters of corresponding color.

24. In a color television system for receiving television signals representing different color-separation values of an object field and reproducing color images therefrom, the combination which comprises means for successively reproducing luminous images representing said different color-separation values, a projection optical system positioned and adapted to project said images to a viewing screen, a color filter having a plurality of groups of different fixed color filter elements spaced in regularly recurring sequence and positioned in the path of the projection light near said optical system, a shutter cooperating with said color filter having alternate transparent and opaque elements designed and adapted to expose filter elements of different color successively upon relative movement of shutter and filter, and means for producing said relative movement to project successive images of different color-separation value through filter elements of respective color.

25. In a color television system for receiving television signals representing different color-separation values of an object field and reproducing color images therefrom, the combination which comprises means for successively reproducing luminous images representing said different color-separation values on a reproducing area, a projection optical system positioned and adapted to project said images to a viewing screen, a color filter disk and a cooperating shutter disk mounted for relative rotation therebetween and positioned transversely in the path of the projected rays from said reproducing area to a conjugate area of the viewing screen, said disks being positioned near said optical system with the axis of rotation substantially coinciding with the optical axis, said filter disk having a plurality of color filter sectors spaced therearound and the shutter disk having transparent and opaque sectors spaced to clear paths through filters of different color successively upon relative rotation, and means for producing said relative rotation synchronized with the reproduction of said luminous images to clear paths through filters of different color as corresponding color-separation values are reproduced.

26. In a color television system for receiving television signals representing different color-separation values of an object field and reproducing color images therefrom, the combination which comprises a cathode-ray tube receiver for successively reproducing luminous images representing said different color-separation values on a reproducing area thereof, a projection optical system positioned and adapted to project said images to a viewing screen, a color filter disk and a cooperating shutter disk mounted for relative rotation therebetween and positioned transversely in the path of the projected rays from said reproducing area to a conjugate area of the viewing screen, said disks being positioned near a principal plane of said optical system with the axis of rotation substantially coinciding with the optical axis, said filter disk having a plurality of color-filter sectors spaced therearound and the shutter disk having transparent and opaque sectors spaced to clear paths through filters of different color successively upon relative rotation, and means for producing said relative rotation synchronized with the reproduction of said luminous images to clear paths through filters of different color as corresponding color-separation values are reproduced, said means being adapted to produce said relative rotation substantially during the blanking intervals betwdeen successive images of different color-separation value.

27. In a color television system for receiving television signals representing different color-separation values of an object field and reproducing color images therefrom, the combination which comprises means for reproducing images representing said color-separation values of received television signals, a projection optical system positioned and adapted to project said images to a viewing screen, a color filter positioned in the path of the projection light near said optical system having a plurality of narrow strips of each of a plurality of different colors, the filter strips of one color being evenly spaced and alternating with strips of different color, a lineating shutter cooperating with said color filter having transparent strips of substantially the same spacing as filter strips of one color, and means for producing relative lateral movement between the lineating shutter and the filter strips to clear light paths successively through filters of different color, said relative movement being synchronized with the reproduction of images of different color-separation values to clear paths through filters of corresponding color.

28. In a color television system for receiving a television signal having successive portions representing different color-separation values of an object field with blanking intervals therebetween, the combination which comprises a receiving device of the storage type adapted to reproduce luminous images representing said color-separation values of a received television signal, said receiving device being designed and adapted to reproduce elemental areas of said images for storage periods not substantially exceeding the blanking intervals between signal portions representing different color-separation values, a projection optical system positioned and adapted to project said luminous images to a viewing screen, a color control device including a plurality of filters of different fixed color positioned in the path of the projected light rays near said optical system and means for passing light through the filters to the viewing screen in succession, and means for synchronizing the operation of the color control device with the reproduction of different color-separation values by the receiving device to reproduce said values in their respective colors.

29. In a color television system for receiving a television signal having successive portions representing different color-separation values of an object field with blanking intervals therebetween, the combination which comprises a cathode-ray receiving tube of the storage type adapted to reproduce luminous images representing said color-separation values of a received television signal on a reproducing area thereof, said cathode-ray tube being designed and adapted to reproduce elemental areas of said images for storage periods not substantially exceeding the blanking intervals between signal portions representing different color-separation values, a projection optical system positioned and adapted to project said luminous images to a viewing screen, a color control device including a plurality of filters of different fixed color positioned in the path of the projected light rays and a light valve positioned and adapted alternatively to obstruct and clear light paths through said filters from said reproducing area to a conjugate area of the viewing screen, said color control device being selectively operable to clear light paths through filters of different color in succession, and means for synchronizing the operation of the color control device with the reproduction of different color-separation values by the cathode-ray tube to reproduce said values in their respective colors.

30. In a color television system for receiving a television signal having successive portions representing successive field scansions in different cyclically recurring primary colors with field blanking intervals therebetween, and for reproducing pictures in natural color therefrom, the combination which comprises a cathode-ray receiving tube of the storage type, means for receiving said television signal and successively reproducing luminous color-separation images corresponding to successive field scansions on a reproducing area of said tube, said cathode-ray tube being designed and adapted to reproduce elemental areas of said images for storage periods approximately equal to said field blanking intervals, a projection optical system positioned and adapted to project said luminous images to a viewing screen, a color control device including a plurality of filters of different fixed color positioned in the path of the projected light rays and a light valve positioned and adapted alternatively to obstruct and clear light paths through said filters from said reproducing area to a conjugate area of the viewing screen, said color control device being selectively operable to clear light paths through filters of different color in succession, and means for operating said color control device during the intervals between the reproduction of luminous images of successive field scansions to clear light paths through filters corresponding to the next succeeding color-separation values respectively.

31. In a color television system for receiving a television signal having successive portions representing different color-separation values of an object field with blanking intervals therebetween, the combination which comprises a storage cathode-ray receiving tube having an electrostatic charge-storage screen and a scanning beam for producing charges thereon in accordance with a received television signal, said screen being constructed to cause said charges to decay and substantially dissipate during respective predetermined intervals approximately equal to said blanking intervals, means utilizing said charge-storage screen for reproducing luminous images representing said color-separation values on a reproducing area, a projection optical system positioned and adapted to project said luminous images to a viewing screen, a color control device including a plurality of filters of different fixed color positioned in the path of the projected light rays and a light valve positioned and adapted alternatively to obstruct and clear light paths through said filters from said reproducing area to a conjugate area of the viewing screen, said color control device being selectively operable to clear light paths through filters of different color in succession, and means for operating said color control device during said blanking intervals to clear light paths through filters corresponding to the next succeeding color-separation values respectively.

32. In a color television system for receiving a television signal having successive portions representing successive field scansions in different cyclically recurring primary colors with field blanking intervals therebetween, and for reproducing pictures in natural color therefrom, the combination which comprises a storage cathode-ray receiving tube having an electrostatic charge-storage screen and a scanning beam for producing charges thereon in accordance with a received television signal, said screen being constructed to cause said charges to decay and substantially dissipate during respective predetermined intervals approximately equal to said blanking intervals, means utilizing said charge-storage screen for reproducing luminous images representing the color-separation values of said primary colors on a reproducing area, a projection optical system positioned and adapted to project said luminous images to a viewing screen, a color control device including a plurality of filters of different fixed color positioned in the path of the projected light rays and a light valve positioned and adapted alternatively to obstruct and clear light paths through said filters from said reproducing area to a conjugate area of the viewing screen, said color control device being selectively operable to clear light paths through filters of different color in succession, and means for operating said color control device during the intervals between the reproduction of luminous images of successive field scansions to clear light paths through filters corresponding to the next succeeding color-separation values respectively.

33. In a color television system for receiving a television signal comprising video signal trains and interposed blanking intervals, successive portions representing different color-separation values of an object field, the combination which comprises a storage receiving device adapted to store said video signal trains, means utilizing said stored signal trains for reproducing said luminous images periodically during predetermined blanking intervals on a reproducing area, the luminous images representing said color-separation values, a projection optical system positioned and adapted to project said luminous images to a viewing screen, a color control device including a plurality of filters of different fixed color positioned in the path of the projected light rays and a light valve positioned and adapted alternatively to obstruct and clear light paths through said filters from said reproducing area to a conjugate area of the viewing screen, said color control device being selectively operable to clear light paths through filters of different color in succession, and means for synchronizing the operation of the color control device with the reproduction of different color-separation values to reproduce said values in their respective colors.

34. In a color television system for receiving a television signal having successive portions representing successive field scansions in different cyclically recurring primary colors with field blanking intervals therebetween, and for reproducing pictures in natural color therefrom, the combination which comprises a cathode-ray receiving tube of the storage type adapted to store successive portions of the television signal with substantially undiminished intensity throughout respective field scansions, means for reproducing luminous images on a reproducing area from said stored signal portions substantially only during said field blanking intervals, said luminous images representing the color-separation values of successive field scansions, a projection optical system positioned and adapted to project said luminous images to a viewing screen, a color control device including a plurality of filters of different fixed color positioned in the path of the projected light rays and a light valve positioned and adapted alternatively to obstruct and clear light paths through said filters from said reproducing area to a conjugate area of the viewing screen, said color control device being selectively operable to clear light paths through filters of different color in succession, and means for operating said color control device between said field blanking intervals to clear light paths through filters corresponding to the next succeeding color-separation values respectively.

PETER C. GOLDMARK.

(References on following page)

REFERENCES CITED

The following references are of record in the file of this patent:

UNITED STATES PATENTS

| Number | Name | Date |
|---|---|---|
| 2,109,540 | Leishman | Mar. 1, 1938 |
| 2,294,820 | Wilson | Sept. 1, 1942 |
| 2,296,908 | Crosby | Sept. 29, 1942 |
| 2,319,804 | Dyer | May 25, 1943 |
| 2,350,892 | Hewson | June 6, 1944 |
| 2,378,746 | Beers | June 19, 1945 |
| 2,389,646 | Sleeper | Nov. 27, 1945 |
| 2,389,979 | Huffnagle | Nov. 27, 1945 |
| 2,415,226 | Sziklai | Feb. 4, 1947 |
| 2,417,621 | Traub | Mar. 18, 1947 |
| 2,457,415 | Sziklai | Dec. 28, 1948 |

Certificate of Correction

Patent No. 2,528,510 November 7, 1950

PETER C. GOLDMARK

It is hereby certified that error appears in the printed specification of the above numbered patent requiring correction as follows:

Column 9, line 72, for the word "as" before "substantially" read *a*; column 13, line 46, for "1%" read *1*; column 15, line 12, before "zero" insert *or*; column 20, line 49, strike out "control", first occurrence;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*